United States Patent
Chapman et al.

(10) Patent No.: US 6,860,695 B2
(45) Date of Patent: Mar. 1, 2005

(54) TRAILER TIPPER

(75) Inventors: Don K. Chapman, Cabot, AR (US); Michael E. White, Bryant, AR (US)

(73) Assignee: Phelps Industries, Inc., Little Rock, AR (US)

( * ) Notice: Subject to any disclaimer, the term of this patent is extended or adjusted under 35 U.S.C. 154(b) by 0 days.

(21) Appl. No.: 10/369,965

(22) Filed: Feb. 19, 2003

(65) Prior Publication Data

US 2003/0175099 A1 Sep. 18, 2003

Related U.S. Application Data

(60) Provisional application No. 60/357,770, filed on Feb. 19, 2002.

(51) Int. Cl.$^7$ .............................................. B65G 67/00

(52) U.S. Cl. ..................... 414/385; 414/582; 414/362

(58) Field of Search ................... 414/385, 386, 414/471, 582, 362, 368; 298/7, 11, 22 R, 17 SG

(56) References Cited

U.S. PATENT DOCUMENTS

| | | | |
|---|---|---|---|
| 5,080,548 A | 1/1992 | Bratlie et al. | 414/385 |
| 5,344,271 A | 9/1994 | Bratlie et al. | 414/385 |
| 5,458,451 A | 10/1995 | Bratlie et al. | 414/385 |
| 6,019,568 A | 2/2000 | Bratlie | 414/583 |
| 6,402,451 B1 * | 6/2002 | Brown | 414/362 |
| 6,579,054 B2 * | 6/2003 | Smith | 414/362 |

* cited by examiner

*Primary Examiner*—James R. Bidwell
(74) *Attorney, Agent, or Firm*—Mark Rogers; Gary N. Speed

(57) ABSTRACT

A trailer tipper is disclosed having a sub-frame, a deck pivotally secured to a rear portion of the sub-frame, and means for raising the deck relative to the sub-frame. A wheel assembly frame is pivotally secured to a rear portion of the sub-frame, and wheels are connected to the wheel assembly frame. An adjustable backstop is provided, having a first member affixed to the deck and a second member slidably secured to the first member and movable over a path that is substantially parallel to the deck. Front and middle stabilizers are pivotally secured to the sub-frame. In the raised position, each stabilizer rests on the deck or sub-frame disposed so that it does not extend outward from an outer side of the sub-frame.

15 Claims, 13 Drawing Sheets

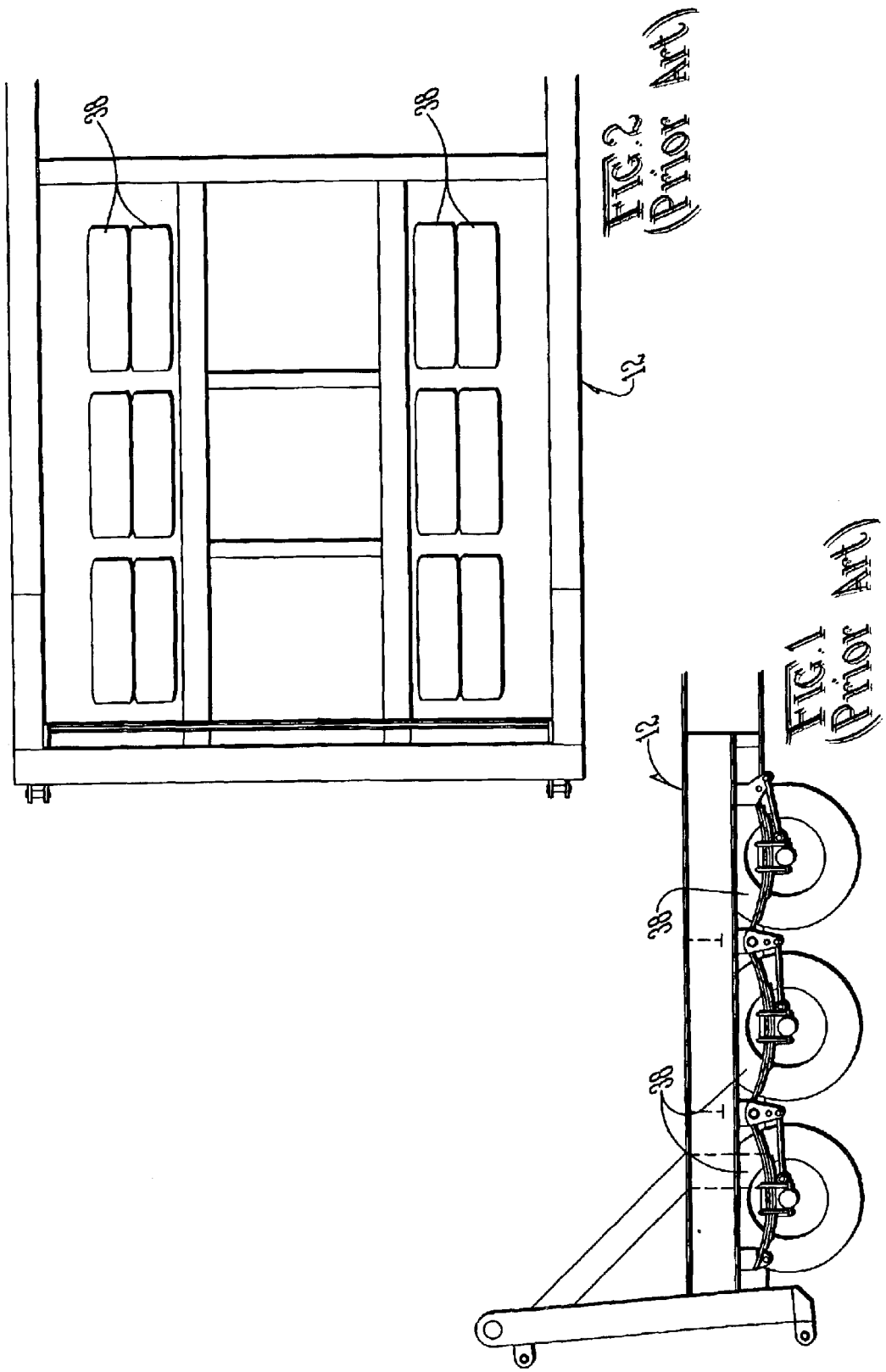

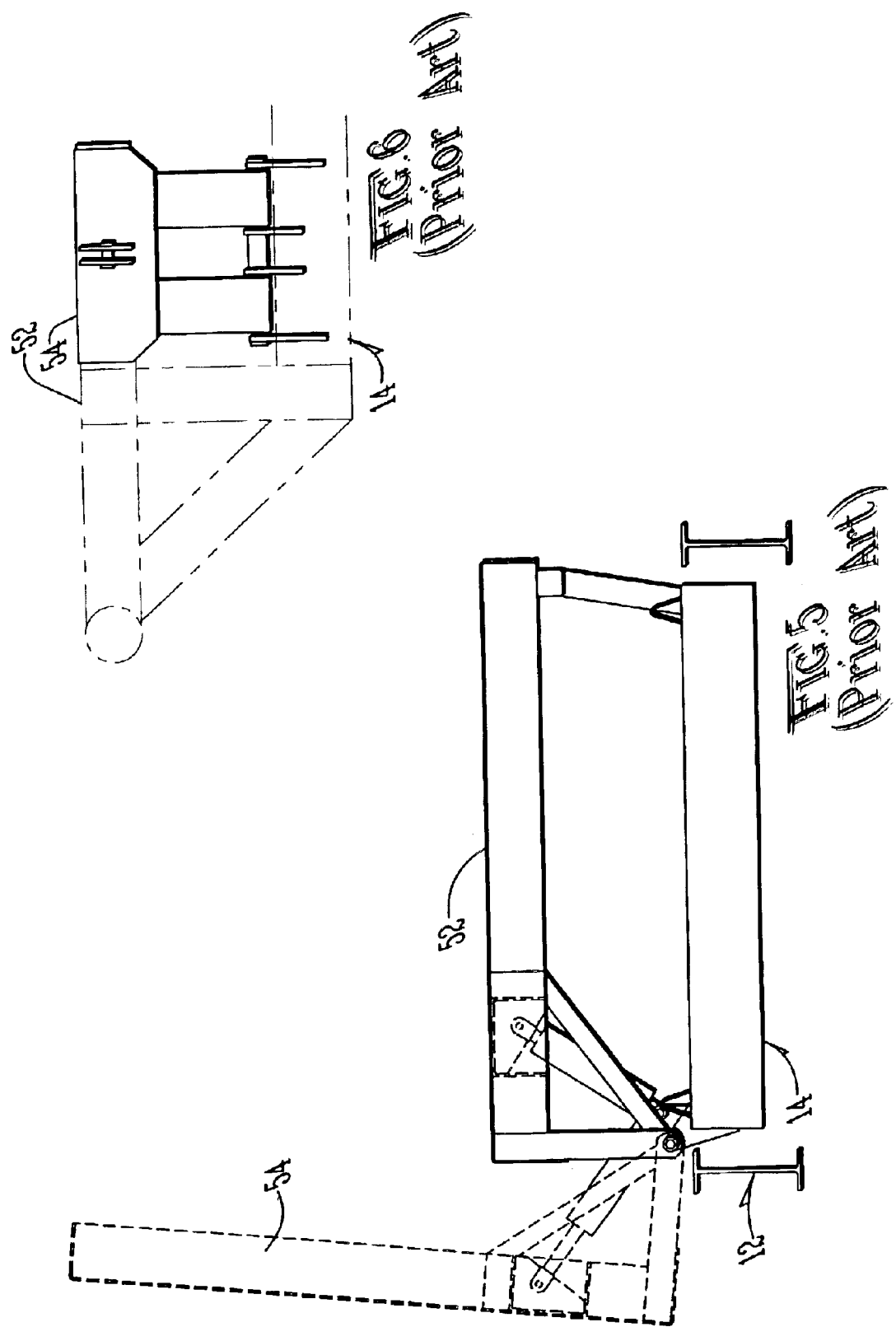

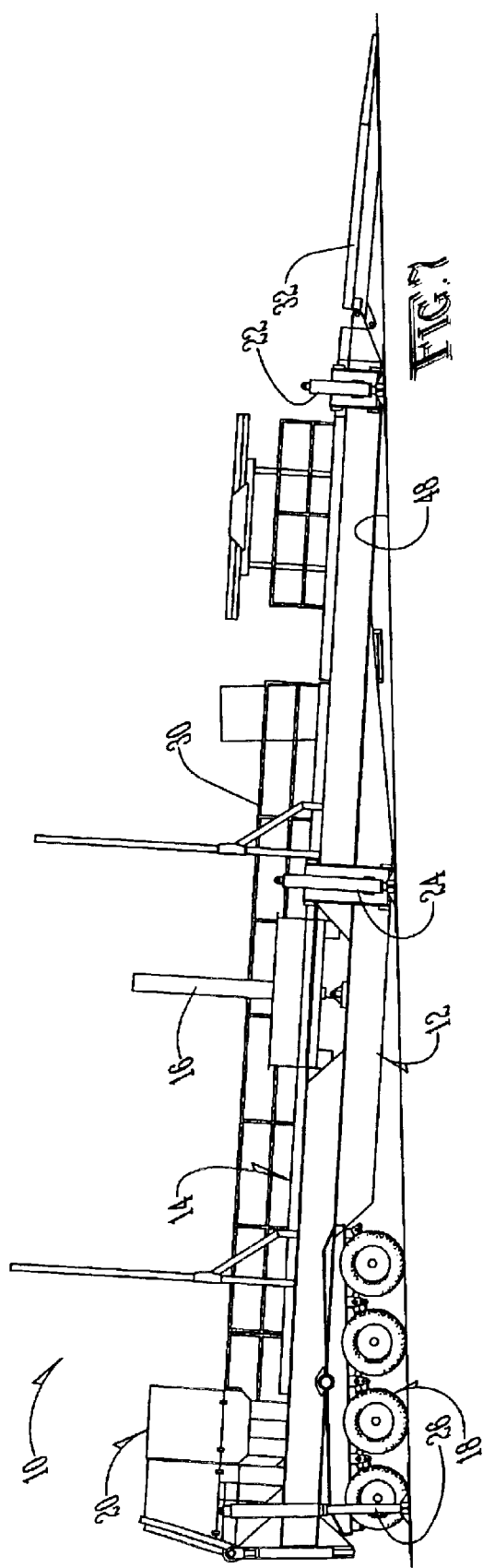

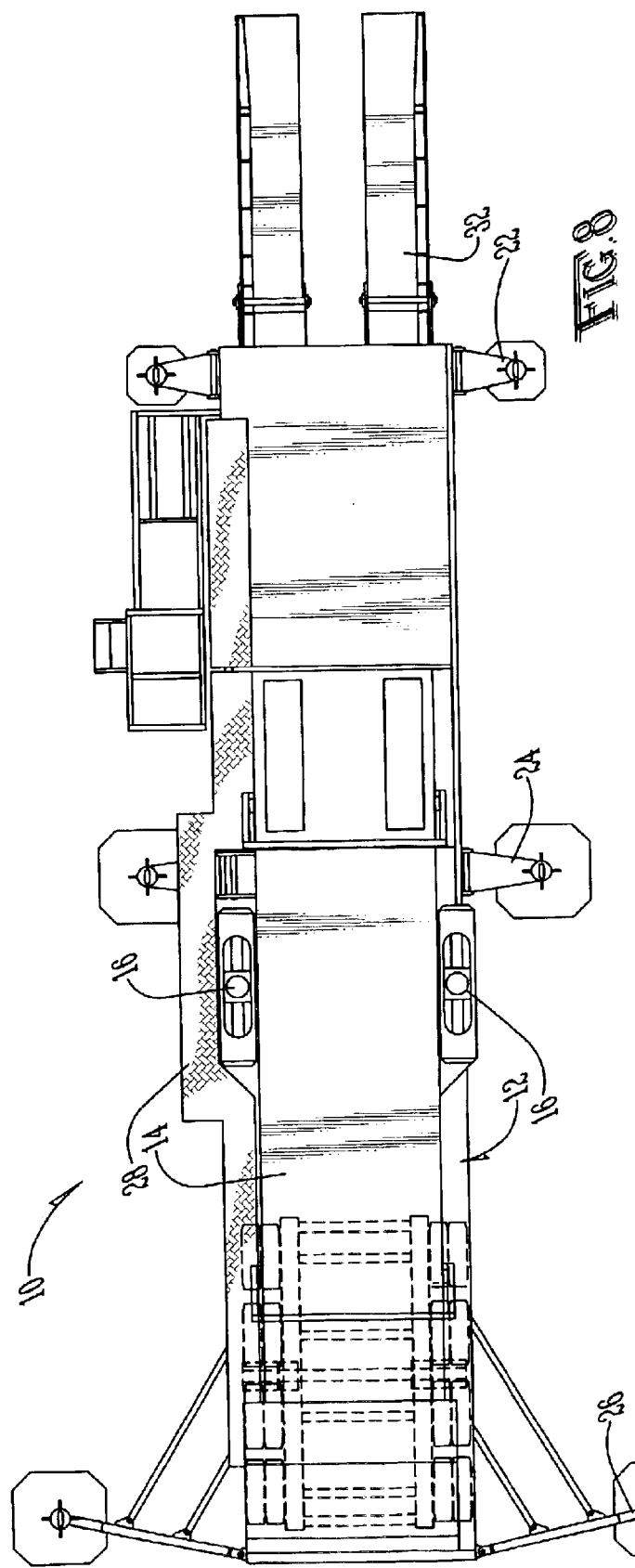

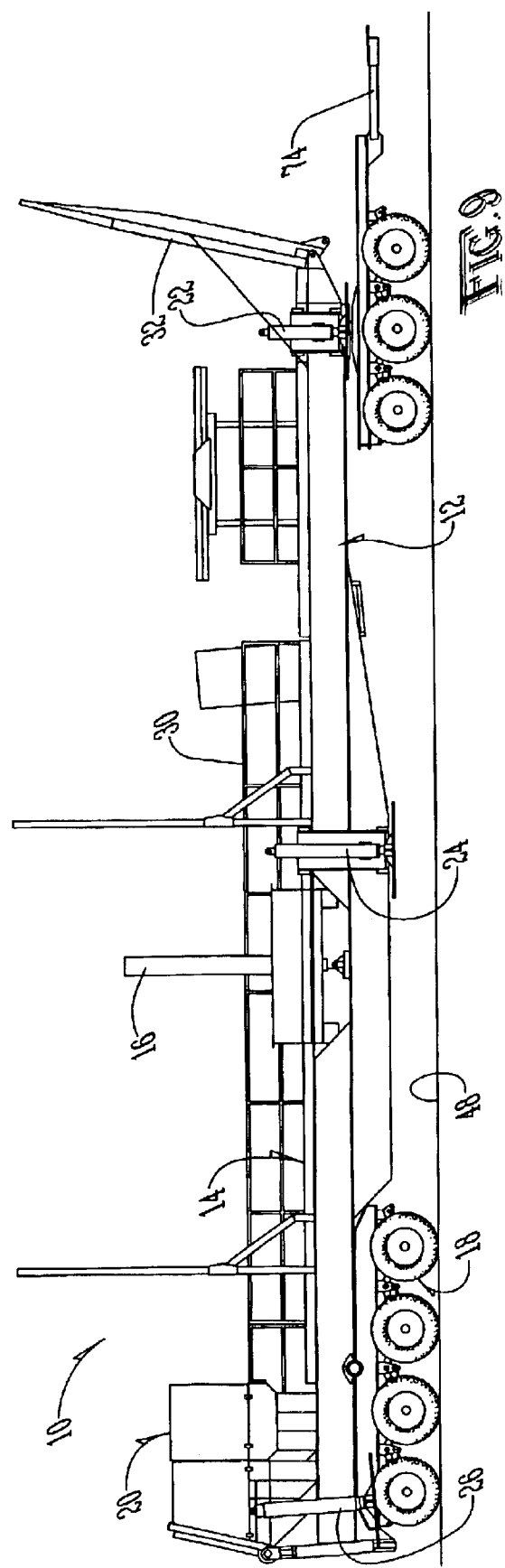

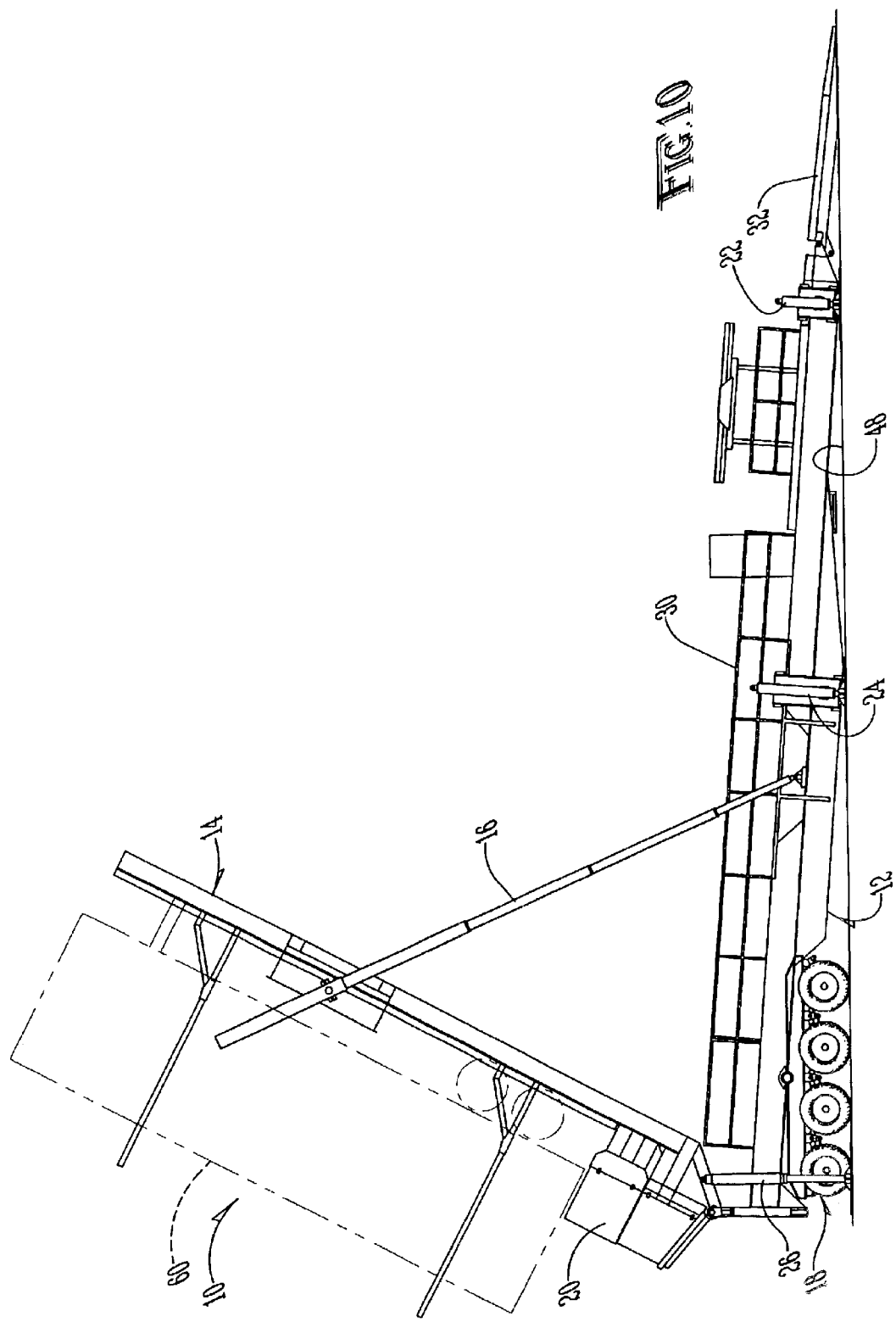

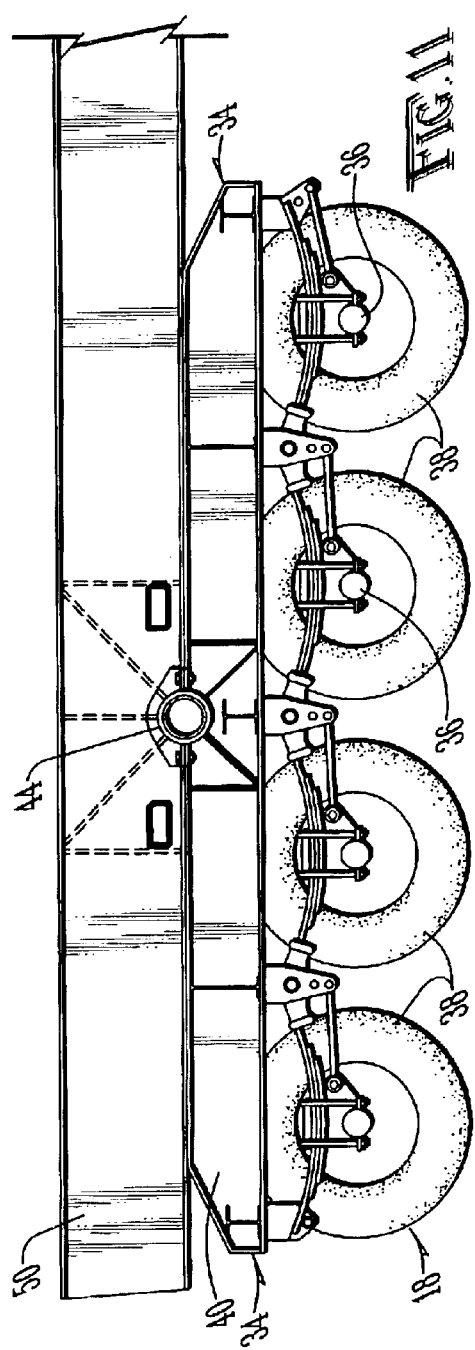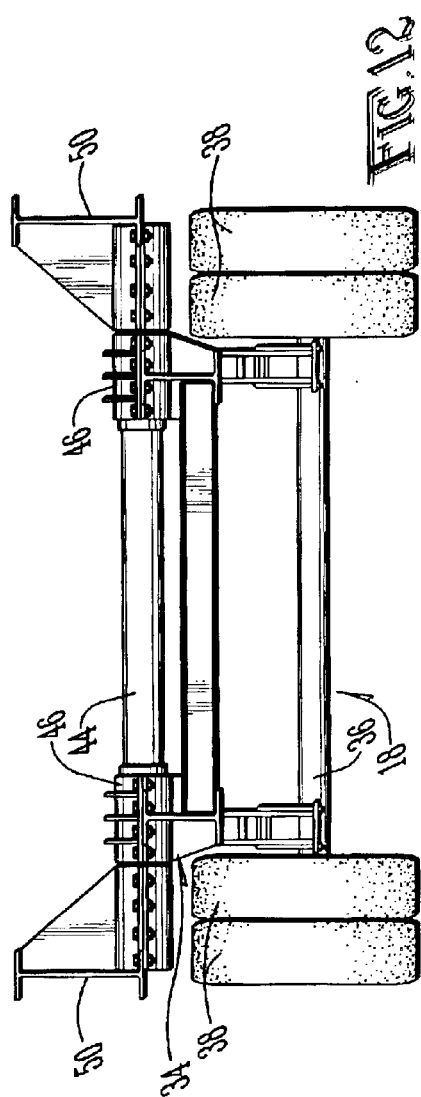

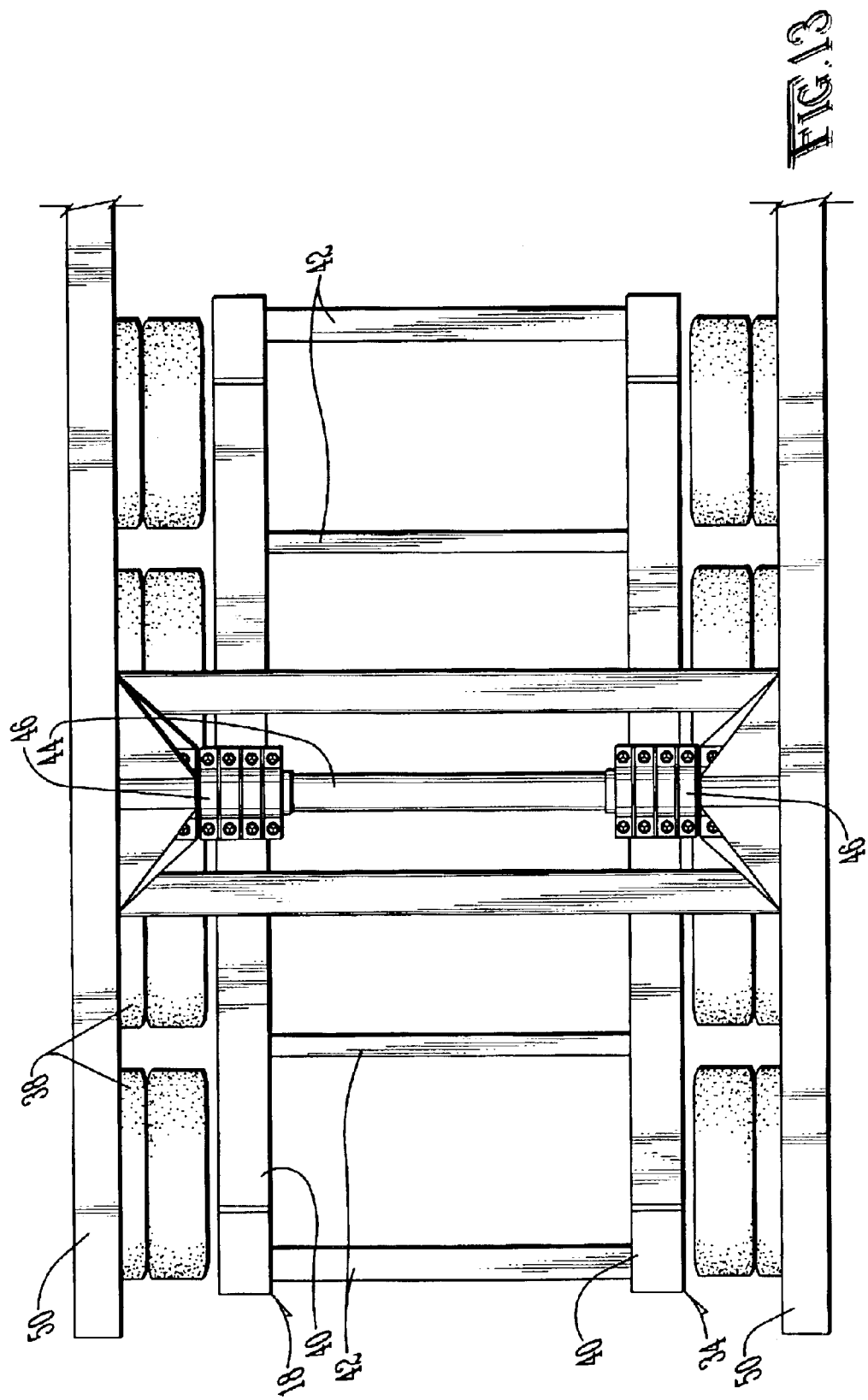

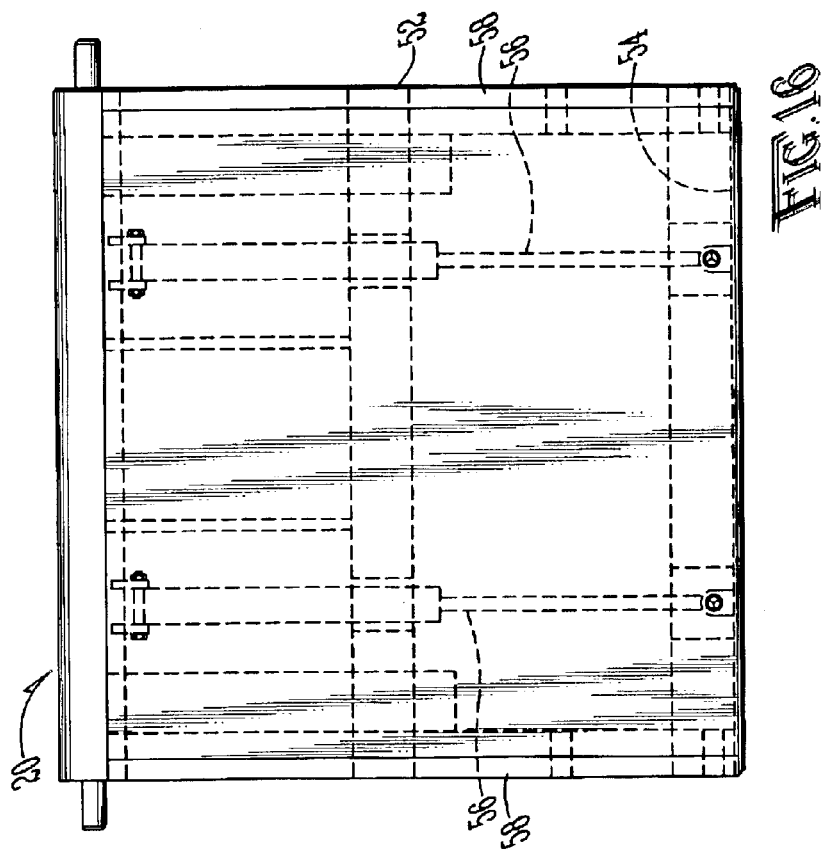
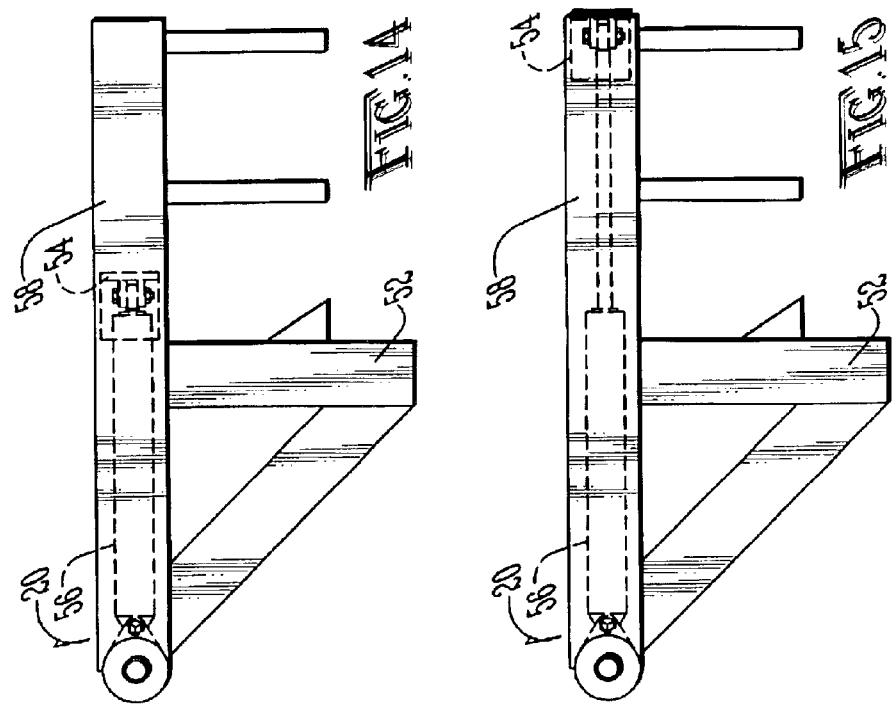

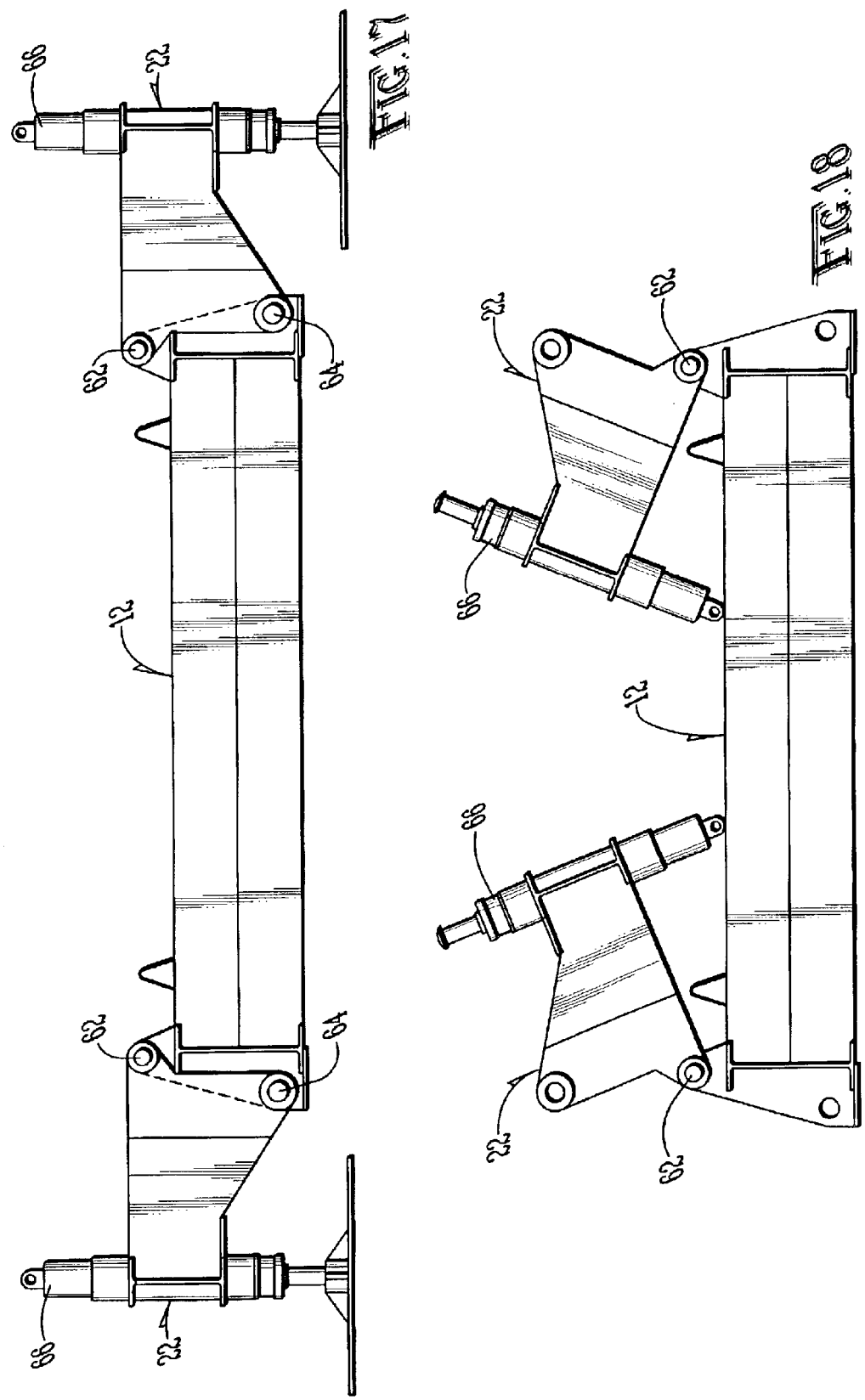

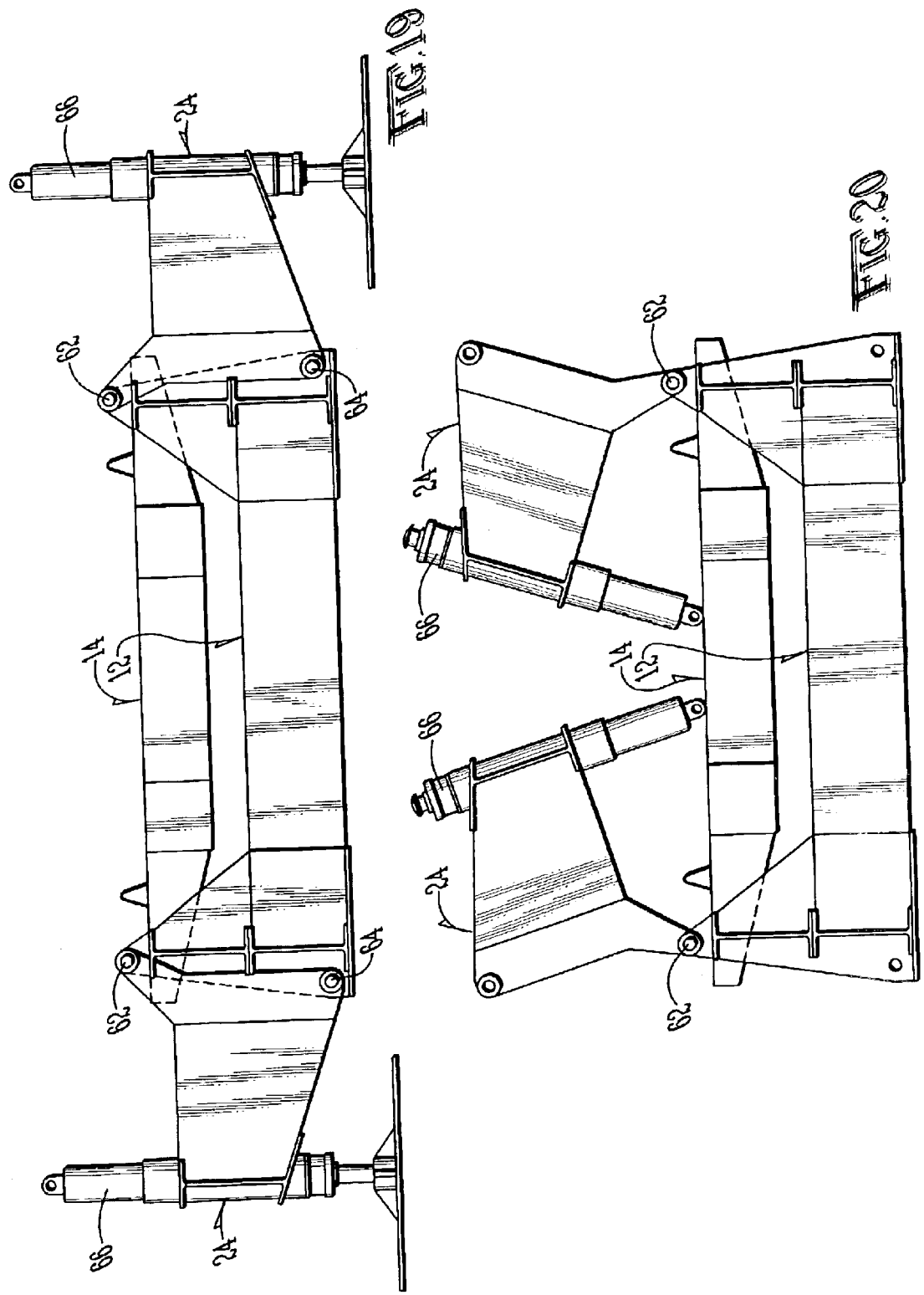

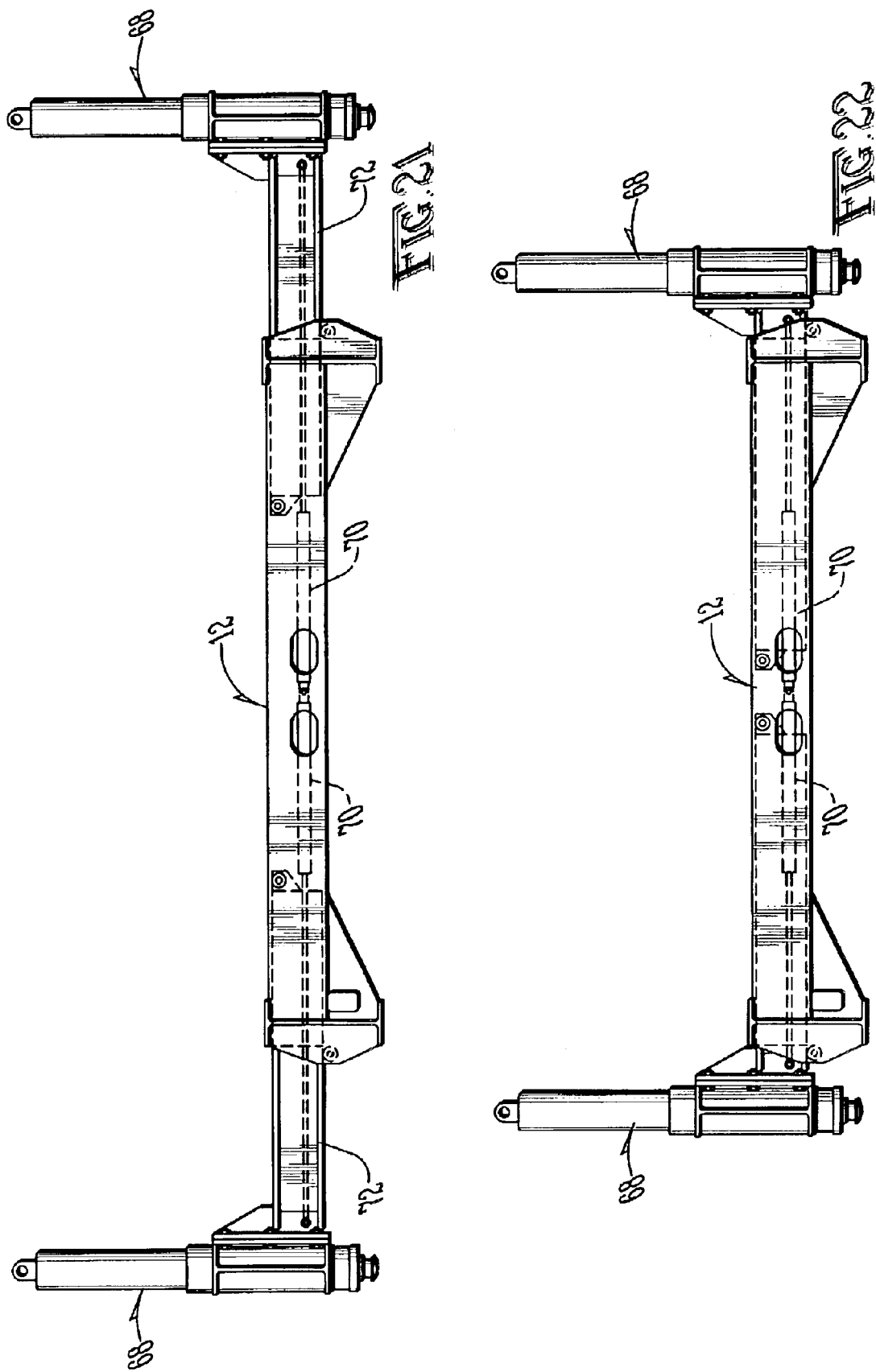

TRAILER TIPPER

This application claims priority from U.S. Provisional Patent Application Ser. No. 60/357,770, filed on Feb. 19, 2002.

BACKGROUND OF THE INVENTION

This invention relates to trailer tippers and, more particularly, to low-profile, portable trailer tippers.

Trailer tippers and low-profile, portable trailer tippers are known in the art. Examples of a few such tippers are disclosed in U.S. Pat. Nos. 5,458,451 and 6,019,568, the disclosures of which are incorporated herein by reference. Prior art tippers offer a number of advantages and make it relatively quick and easy to unload dumpable material from a trailer. Still, these tippers suffer from a number of shortcomings. For example, tippers are relatively large, cumbersome pieces of equipment. Delivery and assembly of such tippers can be difficult, time-consuming, and expensive. For example, in some instances, wheels will be placed on the tipper for delivery and removed after the tipper is put in place at the site at which it will be used. Putting on and taking off wheels is a time-consuming, labor intensive task. There is also the question or problem of how and where to store the wheels after their removal. Further, if the wheels are removed, moving or repositioning the tipper requires the user to find and put on the wheels or requires the user to drag the tipper around without wheels.

Further, prior art tippers typically have the rear wheel axles attached directly to the sub-frame similar to the configuration shown in FIGS. 1 and 2. This results in the wheel assembly being substantially fixed relative to the sub-frame. If all of the wheels are positioned so as to contact the ground on a level surface, then, when the tipper is being transported and moves across uneven surfaces, the load would be shifted more to one set of outside wheels and less or none to the opposite set. When the tipper is set-up on-site and the front of the tipper is rotated to a down position during use, the wheels are also rotated relative to the ground surface. This causes an uneven distribution of the tipper weight to each axle of the wheel assembly. The front axle and wheels are loaded more heavily than the rear axle and wheels. In many instances, the rear wheels bear little or none of the load and are in fact lifted from the ground. At a site with soft ground or footing material this would cause the front wheels to sink and dig into the ground, resulting in more effort in pulling it from one location to another at the same site.

Present tippers that use the fixed wheel assembly also typically have the wheels located inside of the sub-frame. The narrow wheel assembly width provides less stability and places a greater load on the rear stabilizers or outriggers when the tipper is in operation. During transport, this more narrow width reduces the lateral stability and tracking capability of the tipper. Present tippers using a more narrow width sub-frame also have the walkways and handrails attached to the deck which results in an increase in weight that must be lifted by the main cylinders.

Prior art portable trailer dumpers or tippers also typically attach stabilizers or outriggers to the sub-frame using removable pins, such as seen in FIGS. 3 and 4. During transport to the site where the tipper is to be used these outriggers must be removed from the sub-frame and shipped separately. This increases the amount of time required for setup and takedown when the tipper either arrives at or prepares to leave the site.

Prior art tippers also typically have adjustable backstops that employ movable backstop members having little or no flexibility. The movable backstop member is typically pivotally connected to the deck so that it swings up or down to accommodate only two different lengths of trailers during the dumping operation, such as seen in FIGS. 5 and 6. This type of movable backstop member is located in front of the fixed backstop and in the down position allows shorter trailers to be dumped. When dumping a longer trailer, the movable backstop member is rotated upward about a pivot located on one side of the tipper deck. This results in a potentially unsafe condition since the weight of the movable backstop member is suspended over the side of the tipper. In windy conditions, the movable backstop member may also act somewhat like a sail, catching wind and decreasing the stability of the tipper. This type of adjustable backstop also does not provide the flexibility to variably adjust the distance of the movable backstop member from the back of the deck on the fly to accommodate trailers of non-standard lengths or to accommodate trailers with dollies or the like.

SUMMARY OF THE INVENTION

It is therefore an object of the present invention to provide a trailer tipper that is easy and inexpensive to transport, set up, and reposition.

It is a further object of the present invention to provide a tipper of the above type that offers improved stability both during transport and operation.

It is a further object of the present invention to provide a tipper of the above type that reduces the weight of the deck that must be raised and lowered during use.

It is a further object of the present invention to provide a tipper of the above type that maintains relatively even rear wheel loading both during transport and operation.

It is a still further object of the present invention to provide a tipper of the above type that offers a safe and flexible adjustable backstop.

It is a still further object of the present invention to provide a tipper of the above type that provides an adjustable backstop that may be easily adjusted to accommodate trailers having a wide variety of lengths and accessories.

It is a still further object of the present invention to provide a tipper of the above type that reduces the time and labor needed to prepare the tipper for transport and to set up the tipper after transport.

It is a still further object of the present invention to provide a tipper of the above type that offers reduced transport costs.

It is a still further object of the present invention to provide improved methods for transporting, setting up, and using a trailer tipper.

Toward the fulfillment of these and other objects and advantages, the trailer tipper of the present invention has a sub-frame, a deck pivotally secured to a rear portion of the sub-frame, and means for raising the deck relative to the sub-frame. A wheel assembly frame is pivotally secured to a rear portion of the sub-frame, and wheels are connected to the wheel assembly frame. An adjustable backstop is provided, having a first member affixed to the deck and a second member slidably secured to the first member and movable over a path that is substantially parallel to the deck. Front and middle stabilizers are pivotally secured to the sub-frame. In the raised position, each stabilizer rests on the deck or sub-frame disposed so that it does not extend outward from an outer side of the sub-frame.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings, wherein:

FIGS. 1 and 2 are side elevation and overhead views of a prior art tipper showing wheels affixed directly to the sub-frame of the tipper;

FIGS. 5 and 6 are front and side elevation views of a prior art tipper showing a prior art adjustable backstop;

FIG. 7 is a side elevation view of a tipper of the present invention in a position ready for use with the deck in a lowered position;

FIG. 8 is an overhead view of the tipper shown in FIG. 7;

FIG. 9 is a side elevation view of a tipper of the present invention in a position ready for transport or repositioning;

FIG. 10 is a side elevation view of a tipper of the present invention with a trailer on the deck, and the deck in a raised position;

FIG. 11 is a side elevation view of a rear wheel assembly of a tipper of the present invention;

FIG. 12 is a front elevation view of the rear wheel assembly depicted in FIG. 11;

FIG. 13 is an overhead view of the rear wheel assembly depicted in FIGS. 11 and 12;

FIGS. 14 and 15 are side elevation views of an adjustable backstop of a tipper of the present invention;

FIG. 16 is an overhead view of the adjustable backstop depicted in FIGS. 14 and 15;

FIGS. 17 and 18 are front elevation views of a front stabilizer of a tipper of the present invention;

FIGS. 19 and 20 are front elevation views of a center stabilizer of a tipper of the present invention; and FIGS. 21 and 22 are front elevation views of an alternate embodiment of stabilizers of a tipper of the present invention.

DETAILED DESCRIPTION OF THE PREFERRED EMBODIMENT

Figure 3:
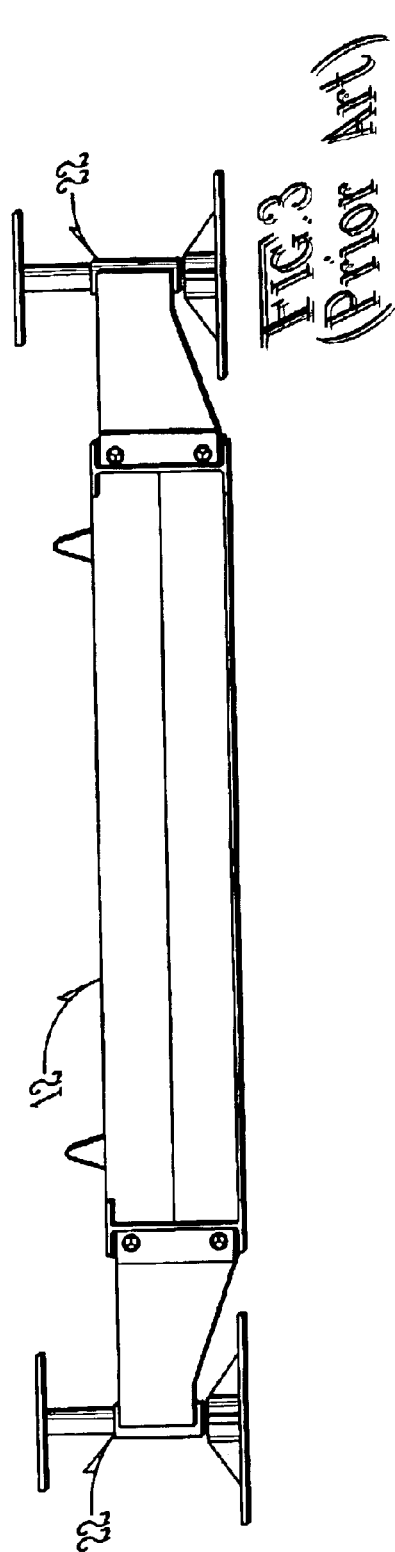
FIGS. 3 and 4 are side elevation views of a prior art tipper showing stabilizers attached to and removed from the tipper.
Figure 4:
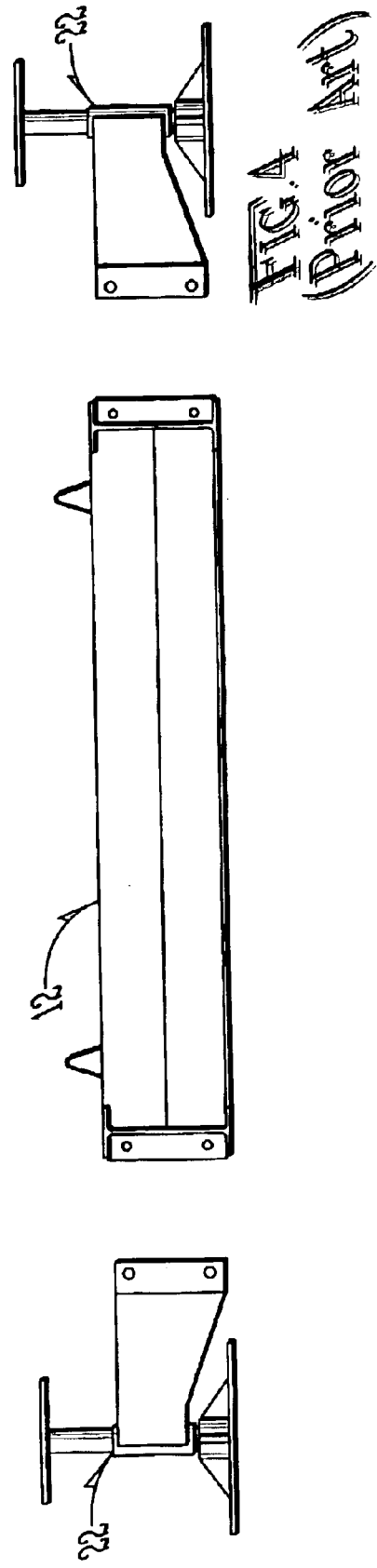

Referring to FIGS. 7–10, the reference numeral 10 refers in general to a tipper of the present invention. The tipper 10 has a sub-frame 12, a deck 14 pivotally secured to a rear portion of the sub-frame 12, and means 16 for raising the deck 14 relative to the sub-frame 12, such as hydraulic cylinders or actuators. A pivoting wheel assembly 18 is pivotally secured to the sub-frame 12 at a rear portion of the sub-frame 12. An adjustable backstop 20 is secured to a rear portion of the deck 14. Front 22, middle or center 24, and rear 26 stabilizers are affixed to the sub-frame 12. Walkways 28 and handrails 30 and a ramp 32 may also be affixed to the sub-frame 12.

The wheel assembly 18 is best seen in FIGS. 11–13. The wheel assembly 18 includes a frame 34, a plurality of axles 36 affixed to the frame 34, and a plurality of wheels 38 rotatably secured to the axles 36. The frame 34 has a lower member formed from rigid elongate members such as longitudinal 40 and transverse I-beams 42. The lower member is affixed to the sub-frame 12 by a single pivot shaft 44 that rotates in two fixed bearings 46 that are attached to the sub-frame 12. This allows the wheel assembly 18 to rotate and move independently of the sub-frame 12. As best seen in FIGS. 11 and 12, upper surfaces of the wheels 38 are disposed below lower surfaces of the sub-frame 12. As best seen in FIGS. 13 and 14, outer side surfaces of the wheels 38 are substantially aligned with outer side surfaces of the sub-frame 12.

This wheel assembly 18 pivots as a unit relative to the sub-frame 12 in such a manner as to maintain contact of all the wheels 38 with the ground or pavement 48 during operation or transport. This new design allows the tipper sub-frame 12 and deck 14 to rotate about the pivot shaft 44 located on the wheel assembly main frame 34. This arrangement allows the independent wheel assembly 18 to maintain even and constant contact with the ground 48.

The present wheel assembly 18 also allows the main beams 50 of the sub-frame 12 to be spaced farther apart, which is advantageous for a number of reasons. For example, it increases the lateral stability of the tipper 10 both during transport and while in operation. By increasing the lateral stability of the wheel assembly 18 the loads to the rear stabilizers 26 or outriggers is reduced. The wider sub-frame 12 also makes it possible to lower the deck 14 of the tipper 10 so that the top surface of the deck 14 is substantially even with the top surface of the sub-frame 12 beams. As a result, the walkways 28 and handrails 30 may be attached to the sub-frame 12 rather than to the deck 14, thereby reducing the amount of weight that the main hydraulic cylinders 16 are required to lift.

The adjustable backstop 20 is best seen in FIGS. 14–16. The adjustable hydraulic backstop has a first backstop member 52 that is affixed to a rear portion of the deck 14 and a second backstop member 54 that is slidably secured to the first backstop member 52. The adjustable backstop member 54 is telescopically secured to the fixed backstop member 52 so that a substantial portion of the adjustable backstop member 54 is disposed within the fixed backstop member 52 when the adjustable backstop member 54 is disposed in the retracted position as shown in FIG. 14. Two hydraulic cylinders 56 are attached to the standard fixed backstop member 52. One end of each hydraulic cylinder 56 is attached to the fixed backstop member 52 and the opposite end of the cylinder 56 is attached to adjustable backstop member 54. Two guides 58, one on each side, are attached to the fixed backstop member 52 to maintain alignment during extension and retraction of adjustable backstop member 54. The hydraulic cylinders 56 move the adjustable backstop member 54 between retracted and extended positions along the guides 58 in a path that is substantially parallel to the upper surface of the deck 14.

When fully retracted, the adjustable backstop member 54 accommodates longer trailer 60 lengths. In order to dump shorter trailers 60, the adjustable backstop member 54 is extended and locked in place. The present design keeps the weight of the adjustable backstop member 54 over the deck 14 and not suspended out past the deck 14 and sub-frame 12 as on prior art tippers, such as the tipper depicted in FIGS. 5–6. This results in increased safety for the tipper 10 operators and any personnel on the ground 48 in the vicinity of the backstop 20. Another advantage of the adjustable backstop 20 of the present invention is the time-savings to the truck operator and the tipper 10 operator. Since the backstop is adjustable to any number of different extended positions, the backstop 20 can accommodate different trailer 60 lengths, even non-standard trailer 60 lengths, and the truck operator is not required to lower and raise the trailer's dolly. The adjustable backstop 20 may be lengthened or shortened as needed so that the front end of the tipper deck 14 will be positioned to miss the truck's tractor as the deck 14 and trailer 60 are rotated up.

The front and center stabilizers 22 and 24 or outriggers of the present invention are best seen in FIGS. 17–20. The stabilizers 22 and 24 are attached to the sub-frame 12 by fixed pins 62 at the top and by removable pins 64 at the bottom. Removing bottom pins 64 allows the stabilizers 22 and 24 to pivot about the top pins 62, so that the stabilizers 22 and 24 may be rotated up and rested on an upper surface of the tipper deck 14 or on an upper surface of the sub-frame 12 as desired, such as during transport. It is understood that the deck 14 typically will not extend over the entire length of the sub-frame 12 and that, in the raised position in a typical embodiment, the front stabilizers 22 will rest on an upper surface of the sub-frame 12 and the middle stabilizers 24 will rest on an upper surface of the deck 14. As best seen in FIGS. 18 and 20, when the stabilizers 22 and 24 are in the raised position, the stabilizers 22 and 24 do not extend outward from an outer side of the sub-frame 12. When the tipper 10 arrives on-site the process is reversed. The stabilizers 22 and 24 are rotated down and bottom pins 64 are inserted to lock the stabilizers 22 and 24 in place. The stabilizers 22 and 24 are designed such that the side plates are fabricated with an arrangement of angles in order to provide the necessary clearance at the areas where the sub-frame 12 and deck 14 are in close proximity to the stabilizers 22 and 24 as the stabilizers 22 and 24 are rotated up for transport. This arrangement of plate angles also allows the stabilizers 22 and 24, when rotated up, to remain within a seven foot distance as measured from the centerline of the tipper 10. In that regard, when the stabilizers 22 and 24 are in the raised position, no portion of the stabilizers 22 and 24 are disposed greater than approximately 7 feet from a plane extending vertically through a center of the sub-frame 12, the plane being aligned substantially parallel to the outer sides of the sub-frame 12. Keeping the stabilizers 22 and 24 from extending outward beyond these dimensions when the stabilizers 22 and 24 are in the raised position allows the tipper 10 to be in the lowest possible state highway department over-width bracket, thereby reducing permit fees and shipping costs.

The present stabilizer arrangement also allows the stabilizers 22 and 24 to be mounted on the sub-frame 12 in the plant. The stabilizers 22 and 24 may be rotated up and rested on the tipper deck 14 or sub-frame 12 in preparation for transport to the site. Upon arrival at the intended site the stabilizers 22 and 24 may be rotated down and the removable bottom pins 64 may be installed. This decreases the amount of set-up time needed to prepare the tipper 10 for use. The stabilizers 22 and 24 may be equipped with either hydraulic cylinders 66 for a hydraulic stabilizer or outrigger or manual screws for a manual stabilizer or outrigger.

FIGS. 21 and 22 show an alternate embodiment of stabilizers 68 of the present invention. In this alternate embodiment, hydraulic cylinders 70 move elongate stabilizer members 72 in a substantially horizontally path between a retracted transport position and an extended operating position.

In operation, to prepare the tipper 10 for transport or repositioning, the stabilizers 22 and 24 are pivoted up into the raised position, resting on the deck 14 or sub-frame 12 so that the stabilizers 22 and 24 do not extend outward from outer sides of the sub-frame 12. The tipper 10 is connected to a tractor or trailer 74, such as seen in FIG. 9, and is transported, typically over a public road or highway, to a desired site at which the tipper 10 is to be used. As best seen in FIG. 7, at the site, the tipper 10 is removed from the trailer 74 or tractor and the sub-frame 12 is pivoted about the shaft 44 so that a front portion of the sub-frame 12 is lowered toward the ground 48 without raising any of the wheels 38 from the ground 48. At the site, the stabilizers 22 and 24 are also pivoted to the lowered position, and the bottom pins 64 are inserted to lock the stabilizers 22 and 24 in the lowered position. The adjustable backstop member 54 is retracted or extended as desired to accommodate a trailer 60 of a desired length to be tipped for unloading. A tractor backs a trailer 60 to be unloaded up the ramp 32 and onto the deck 14, and the trailer 60 is disconnected from the tractor. The hydraulic cylinders 16 are actuated to pivotally raise the deck 14 and trailer 60 relative to the sub-frame 12, dumping or unloading dumpable material disposed within the trailer 60. After the trailer 60 is unloaded, the deck 14 is lowered, the trailer 60 is connected to a tractor, and the tractor removes the trailer 60 from the tipper 10, clearing the way for another trailer 60 to be unloaded.

Other modifications, changes and substitutions are intended in the foregoing, and in some instances, some features of the invention will be employed without a corresponding use of other features. For example, it is understood that the features described above may be used in different combinations and that not all features are required to practice the present invention. For example, in one embodiment depicted in FIGS. 7–10, the pivoting wheel assembly 18 and swing-up stabilizers 22 and 24 or outriggers are used, but the adjustable hydraulic backstop 20 of the present invention is not used. Similarly, in FIG. 9, the front and center stabilizers 22 and 24 have not been rotated upward onto the deck 14. It is understood that these stabilizers 22 and 24 need not be used and, if used, need not be placed in the raised position before transporting or repositioning the tipper 10. The stabilizers 22 and 24 will typically be placed in the raised position when the tipper 10 is to be transported on public roads or highways between different sites, but this is not required. Also, the stabilizers 22 and 24 will typically not be placed in the raised position when the tipper 10 is simply being repositioned or relocated at a particular site, but the stabilizers 22 and 24 may be placed in the raised position for such repositioning or relocating if desired. Of course, quantitative information is included by way of example only and is not intended as a limitation as to the scope of the invention. Accordingly, it is appropriate that the invention be construed broadly and in a manner consistent with the scope of the invention disclosed.

What is claimed is:

1. An apparatus, comprising:
   a first frame;
   a deck pivotally secured to a rear portion of said first frame, said deck being sized to support a trailer;
   means secured to said first frame and said deck for raising said deck relative to said first frame;
   a second frame, said second frame being pivotally secured to said rear portion of said first frame; and
   a plurality of wheels rotatably connected to said second frame; and wherein said second frame comprises:
      a lower member, said plurality of wheels being rotatably connected to said lower member; and
      a shaft affixed to and disposed above said lower member, said shaft being pivotally secured to said first frame.

2. The apparatus of claim 1, further comprising a walkway and handrail affixed to said first frame.

3. An apparatus, comprising:
a first frame;
a deck pivotally secured to a rear portion of said first frame, said deck being sized to support a trailer;
means secured to said first frame and said deck for raising said deck relative to said first frame;
a second frame, said second frame being pivotally secured to said rear portion of said first frame; and
a plurality of wheels rotatably connected to said second frame, upper surfaces of said plurality of wheels being disposed below lower surfaces of said first frame.

4. The apparatus of claim 3, wherein when said deck is in a lowered position, a top surface of said deck is substantially even with a top surface of said first frame.

5. An apparatus, comprising:
a first frame;
a deck pivotally secured to a rear portion of said first frame, said deck being sized to support a trailer;
means secured to said first frame and said deck for raising said deck relative to said first frame;
a second frame, said second frame being pivotally secured to said rear portion of said first frame; and
a plurality of wheels rotatably connected to said second frame; and wherein said plurality of wheels comprises first and second wheels disposed on opposite sides of said second frame; and
an outer side surface of said first wheel is substantially aligned with an outer side surface of said first frame.

6. An apparatus, comprising:
a first frame;
a deck pivotally secured to a rear portion of said first frame, said deck being sized to support a trailer;
means secured to said first frame and said deck for raising said deck relative to said first frame;
a second frame, said second frame being pivotally secured to said rear portion of said first frame;
a plurality of wheels rotatably connected to said second frame; and a first stabilizer pivotally secured to said first frame, said first stabilizer being movable between a lowered position and a raised position in which said first stabilizer rests on said deck so that said first stabilizer does not extend outward from an outer side of said first frame.

7. A method comprising:
(1) providing a trailer tipper, said tipper comprising:
a first frame;
a deck pivotally secured to a rear portion of said first frame, said deck being sized to support a trailer;
means secured to said first frame and said deck for raising said deck relative to said first frame; and
a first stabilizer pivotally secured to said first frame, said first stabilizer being movable between a lowered position and a raised position in which said first stabilizer rests on said deck so that said first stabilizer does not extend outward from an outer side of said first frame;
(2) placing said first stabilizer in said raised position;
(3) after step (2), transporting said tipper over a public road or highway to a site at which said tipper is to be used; and
(4) after step (3), lowering said first stabilizer to said lowered position; and wherein said tipper further comprises at least four wheels operably connected to said first frame, and further comprising:
after step (3), lowering a front portion of said first frame without raising any of said at least four wheels from a ground surface.

8. An apparatus, comprising:
a first frame;
a deck pivotally secured to a rear portion of said first frame, said deck being sized to support a trailer;
means secured to said first frame and said deck for raising said deck relative to said first frame; and
a first stabilizer pivotally secured to said first frame, said first stabilizer being movable between a lowered position and a raised position in which said first stabilizer rests on said deck so that said first stabilizer does not extend outward from an outer side of said first frame.

9. The apparatus of claim 8, wherein in said raised position, no portion of said first stabilizer is disposed greater than approximately 7 feet from a plane extending vertically through a center of said first frame, said plane being aligned substantially parallel to said outer side of said first frame.

10. An apparatus, comprising:
a first frame;
a deck pivotally secured to a rear portion of said first frame, said deck being sized to support a trailer;
means secured to said first frame and said deck for raising said deck relative to said first frame;
a first backstop member affixed to a rear portion of said deck;
a second backstop member slidably secured to said first backstop member; and
means for moving said second backstop member from a retracted position to an extended position over a path that is substantially parallel to an upper surface of said deck.

11. The apparatus of claim 10, wherein said means for moving said second backstop member from a retracted position to an extended position over a path that is substantially parallel to an upper surface of said deck comprises:
first and second guide members affixed to opposite sides of said first backstop member, said first and second guide members defining a path that is substantially parallel to said upper surface of said deck; and
a hydraulic actuator secured to said first and second backstop members.

12. The apparatus of claim 11, wherein said hydraulic actuator may position said second backstop member in a plurality of different extended positions in which a front face of said second member is disposed a plurality of different distances from a front face of said first backstop member.

13. The apparatus of claim 10, wherein said second backstop member is telescopically secured to said first backstop member so that a substantial portion of said second backstop member is disposed within said first backstop member when said second backstop member is disposed in said retracted position.

14. The apparatus of claim 10, further comprising:
a second frame, said second frame being pivotally secured to said first frame; and
a plurality of wheels rotatably connected to said second frame.

15. The apparatus of claim 10, further comprising:
a first stabilizer pivotally secured to said first frame, said first stabilizer being movable between a lowered position and a raised position in which said first stabilizer rests on said deck so that said first stabilizer does not extend outward from an outer side of said first frame; and
a first locking member for securing said first stabilizer in said lowered position.

* * * * *